(No Model.)
R. M. HUNTER.
ELECTRIC RAILWAY.
No. 450,586. Patented Apr. 14, 1891.
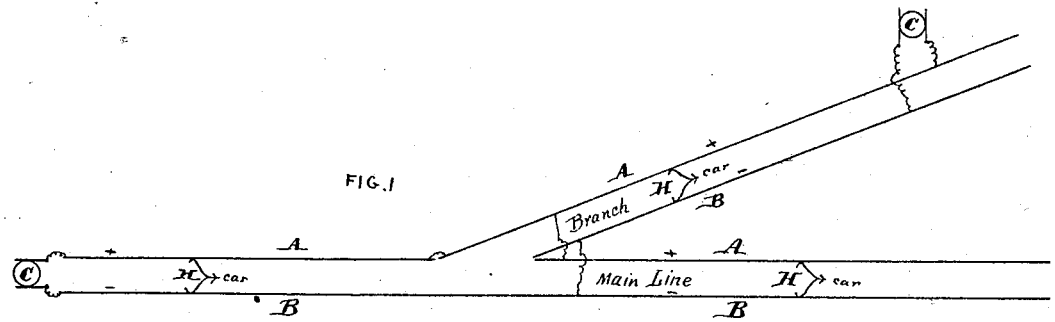
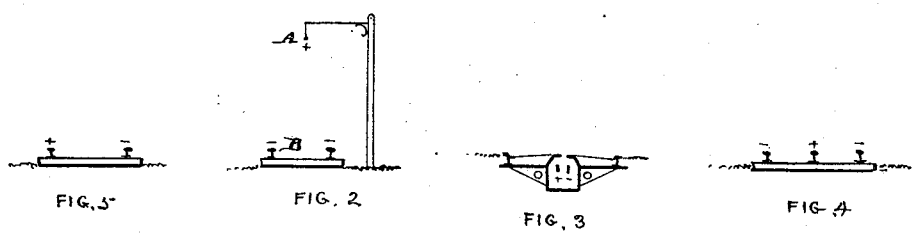
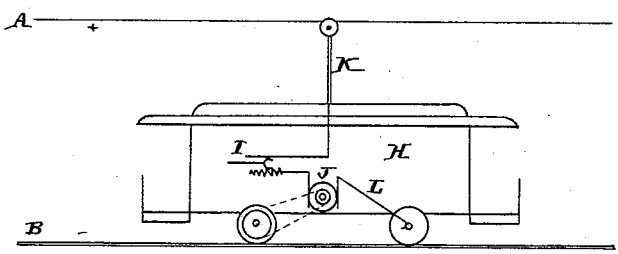
Attest
A. J. Dunn
S. T. Yerkes
Inventor
R. M. Hunter

UNITED STATES PATENT OFFICE.

RUDOLPH M. HUNTER, OF PHILADELPHIA, PENNSYLVANIA, ASSIGNOR, BY MESNE ASSIGNMENTS, TO THE THOMSON-HOUSTON ELECTRIC COMPANY, OF BOSTON, MASSACHUSETTS.

ELECTRIC RAILWAY.

SPECIFICATION forming part of Letters Patent No. 450,586, dated April 14, 1891.

Original application filed June 4, 1889, Serial No. 313,095. Divided and this application filed September 4, 1890. Serial No. 363,899. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railways; and it consists of certain improvements, which are fully set forth in the following specification, and shown in the accompanying drawings, which form a part thereof.

This application (Case No. 165) is a division of my application, (Case No. 102,) Serial No. 313,095, filed June 4, 1889.

My invention comprehends an electric-railway system wherein there is a branch or auxiliary track supplied with conductors, and in which the main line and the branch are provided with independent sources of electric power. The main-line and branch conductors may be coupled in multiple, if so desired. The conductors may be arranged in different ways—as, for instance, the positive conductor may be suspended above the railway and the rails and earth may be the return-conductors, or one or more conductors may be contained in a slotted conduit; or the third rail or positive conductor may be arranged along the track upon the surface and the rails used as the return-conductors; or one rail may be used as a positive conductor and the other rail as a negative conductor. I prefer the first-mentioned construction.

The railway may be provided with electrically-propelled cars, each of which is furnished with an electric motor suitably connected with the axle of the car for propelling it; also, with a regulator for controlling the current supplied to the motor, and also with suitable current-collecting devices for receiving current from the conductors. In the preferred form the collector extends upwardly from the roof of the car and makes a traveling under contact with the suspended conductor.

In the drawings, Figure 1 is a plan view showing the circuits of a main-line and branch railway embodying my invention. Figs. 2, 3, 4, and 5 are cross-sections of the various forms of electric railways, showing different arrangements of conductors; and Fig. 6 is an elevation of an electrically-propelled car.

A and B are the two lines of working-conductors, and may include or not, as desired, the rails.

C C are separate generators, one of which supplies current to the main line and the other to the branch line. If desired, these conductors of the main line and branch may be connected in multiple, so that part of the current from each of the separate generators may pass to the set of conductors with which it is not directly connected, and thereby equalize the current in the various conductors of the system. As shown, one of the generators is coupled with one end of the main-line conductors, and the other generator is coupled with the branch conductors at a distance electrically from the main-line generator; but it is to be borne in mind that these generators are connected in multiple through the conductors A B, and one assists the other in supplying the necessary current to meet the demands, obviating the defects which would result from local leakages and short-circuiting of the current.

It is evident that the branch circuit, instead of passing in the direction shown, might be directed toward the generator of the main line A B, and thus the two generators might be arranged close together, if so desired. The conductors A may be either suspended above the railway-track, placed in a conduit, or arranged on the surface, as indicated in Figs. 2, 3, 4, and 5, and the conductor B may be the rails and earth or may be a separate insulated conductor, as is also indicated in said figures.

In Fig. 6 is shown an electric car H, having an electric motor J to propel it. K is the contact for collecting the current in the conductor A and supplying it to the motor-circuit L on the car, the current being regulated by a resistance changer or regulator I. While I prefer the upwardly-extending under-running contact, as indicated, working in conjunction with the suspended positive conductor, any form of collector may be used to suit either of the systems shown in Figs. 2, 3, 4, and 5.

When a large number of cars are in circuit, the operation of the resistance-changers I on the various cars constantly varies the current flowing through the motors, and thus varies the demand for current. When large numbers of cars congregate at one portion of the railway, it takes considerable current, and there might be a lack of current if it were not for the addition of the independent generators supplying the conductors at different places.

There are varieties of contingencies which must be met in practical operation of an electric railway employing line-conductors, and those specified in this application are some which are deemed important.

I do not limit myself to the details of construction, as they might be modified in various ways without departing from the principles of my invention.

Having now described my invention, what I claim as new, and desire to secure by Letters Patent, is—

1. In a branching electric railway, a main-line conductor and a branch-line conductor extending along the main-line and branch tracks, respectively, in combination with two generators, one connected to the main-line conductor and the other connected to the branch-line conductor.

2. In a branching electric railway, a main-line conductor and a branch-line conductor extending along the main-line and branch tracks, respectively, and electrically connected, in combination with two distantly-located generators, one connected to the main-line conductor and the other connected to the branch-line conductor.

In testimony of which invention I have hereunto set my hand.

R. M. HUNTER.

Witnesses:
ERNEST HOWARD HUNTER,
A. J. DUNN.